United States Patent [19]

Henke et al.

[11] 4,282,746
[45] Aug. 11, 1981

[54] RATE-OF-USE FUEL CONSUMPTION INDICATOR FOR COMBUSTION ENGINES

[75] Inventors: Ulrich Henke, Alsdorf; Hans Baumgartner, Viersen, both of Fed. Rep. of Germany

[73] Assignee: Pierburg GmbH & Co. KG, Neuss, Fed. Rep. of Germany

[21] Appl. No.: 92,107

[22] Filed: Nov. 7, 1979

[30] Foreign Application Priority Data

Nov. 18, 1978 [DE] Fed. Rep. of Germany ....... 2850086

[51] Int. Cl.³ .............................................. G01F 9/02
[52] U.S. Cl. ................................... 73/114; 73/119 A
[58] Field of Search .............. 73/114, 113, 115, 119 A

[56] References Cited

U.S. PATENT DOCUMENTS

| 3,916,682 | 11/1975 | Garcea | 73/114 |
| 4,223,553 | 9/1980 | Fiala | 73/115 |

FOREIGN PATENT DOCUMENTS

| 1031980 | 6/1958 | Fed. Rep. of Germany . | |
| 2440398 | 3/1976 | Fed. Rep. of Germany . | |
| 2731065 | 1/1979 | Fed. Rep. of Germany | 73/114 |
| 1162371 | 9/1958 | France . | |

Primary Examiner—Jerry W. Myracle
Attorney, Agent, or Firm—Haseltine & Lake

[57] ABSTRACT

An arrangement for indicating the on-going fuel consumption of an operating internal combustion engine in a motor vehicle having a multi-stage transmission. An engine operating parameter indicative of the quantity of fuel being supplied to the engine per engine revolution, is sensed or detected, and a signal representative of the sensed parameter is transmitted to an indicating instrument. The signal is modulated, furthermore, as a function of the currently engaged stage of the transmission. The modulating action may be carried out by a pressure transducer and the signal may be transmitted through a passage connecting the output of the transducer with the indicating instrument. The sensing procedure may be carried out through another passage connecting an input of the transducer with the intake manifold of the engine downstream of the throttle valve.

9 Claims, 12 Drawing Figures

RATE-OF-USE FUEL CONSUMPTION INDICATOR FOR COMBUSTION ENGINES

BACKGROUND OF THE INVENTION

The present invention relates to a fuel consumption indicator for combustion engines.

More particularly, the invention relates to a rate-of-use fuel consumption indicator, i.e. an indicator which provides a vehicle operator with on-going information concerning the rate at which his vehicle uses fuel.

As petroleum-based fuels for combustion engines become increasingly scarce, attempts are being made everywhere to reduce consumption. One such attempt, already required by legislation in certain countries, is to provide devices which will keep the operator of a motor vehicle informed about the fuel-efficiency of his driving behavior, i.e. which will provide him with information concerning the on-going fuel consumption of his combustion engine in order to enable him to vary his driving style so as to obtain greater fuel-efficiency, that is to say lower fuel consumption.

Devices for this purpose are already known and utilize a metering device, for example a turbine flow meter, which meters the fuel passing to the engine. These devices produce a signal, usually an electrical signal, which indicates the amount of fuel flowing to the engine per unit time. This signal is then related in a quotient circuit with a signal which is indicative of the rate of speed of the vehicle and which may be derived from the speedometer, and an outward signal is created which indicates the rate at which fuel is being used per unit distance traveled by the vehicle.

The accuracy of these known devices is not in question; it is adequate in all speed ranges. However, these devices are rather elaborate and therefore expensive and subject to malfunction. In addition, they must necessarily interfere to some extent with the fuel flow and the flow resistance opposed to the fuel by the metering device may, at relatively high ambient temperature, lead to the formation of vapor bubbles in the fuel feeding system, causing what is known as "vapor lock" which stops the engine for lack of fuel passing to it. Even at ordinary ambient temperature, however, there may be considerable interference with the flow of fuel to the engine if, for example, a blockage in the metering device results in a substantial increase in the flow resistance of the fuel.

Another proposal known from the prior art is for a device which senses the pressure in the suction or intake manifold of the engine at a point downstream of the throttle valve, and which indicates this pressure on a measuring device, i.e. a manometer. The indication on the dial of the device is provided either as a "tendency indication" indicating economical and uneconomical driving styles, or it may be provided in terms of an indication of fuel consumption per unit of distance traveled with the vehicle driving in a certain transmission gear, i.e. fourth gear or third gear as a general rule. If an indication of a general tendency is provided, this is usually quite inaccurate; the more specific indication providing information on fuel consumption per unit of distance travelled is only for one particular gear of the transmission and provides no information when the vehicle is driven in one of the other gears. Moreover, the driver has no way of determining from this information which gear would be optimal for the particular operating conditions prevailing at any given time. In fact, incorrect information is even furnished to the driver when he shifts from e.g. fourth gear into third gear, since under these circumstances there is always an indication of a reduction of fuel consumption even though in some circumstances a substantial increase will be the result.

Although it might suggest itself as an obvious remedy to provide the indicating instrument with a second dial which indicates fuel consumption when the vehicle travels in a second one of the gears, e.g. in the third gear, this is actually not feasible in practice because it requires the operator to ascertain, whenever he consults the instrument, in which gear he is driving at this particular time. This is distracting and may cause accidents. Another possibility which is conceivable would be to provide different dials each indicating fuel consumption for a particular gear of the transmission, and an arrangement whereby the dial associated with a particular gear is moved into position for visual observation whenever the operator changes gears. This, however, would be very complicated and, hence, not only expensive but also highly susceptible to malfunctions.

SUMMARY OF THE INVENTION

Accordingly, it is an object of the present invention to overcome the disadvantages of the prior art.

A more particular object of the invention is to provide a novel and improved method of indicating the on-going fuel consumption of an operating internal combustion engine in a motor vehicle having a multi-stage transmission.

Another object of the invention is to provide an arrangement for carrying out the inventive method.

A concomitant object of the invention is to provide a method and an arrangement which are simple, inexpensive to implement and highly reliable and resistant to malfunction.

Still a further object of the invention is to assure that the method and arrangement are suitable for use with both Otto engines and Diesel engines.

In keeping with these objects, and with others which will become apparent hereafter, one feature of the invention resides in a method of indicating the on-going fuel consumption of an operating internal combustion engine in a motor vehicle having multi-stage transmission. Briefly stated, this method may comprise the steps of sensing an engine operating parameter indicative of the quantity of fuel being supplied to the engine per engine revolution, transmitting a signal representative of the sensed parameter to an indicating instrument, and modulating the signal as a function of the currently engaged stage of the transmission.

An arrangement for implementing the method according to the invention may, briefly stated, comprise means for sensing an engine operating parameter indicative of the quantity of fuel being supplied to the engine per engine revolution, an indicating instrument, means for transmitting to the instrument a signal representative of the sensed parameter, and means for modulating the signal as a function of the currently engaged stage of the transmission.

The invention is based on the well-founded assumption that in any particular piston-type internal combustion engine of a motor vehicle having a mechanical transmission, there exists a constant ratio for each transmission stage (transmission gear) between the number of road wheel revolutions of the vehicle and the number of engine revolutions. This means, therefore, that there is a direct relationship between the quantity of fuel supplied to the engine per operating stroke and the distance traveled by the vehicle on the amount of fuel thus supplied and consumed in the engine, since each operating stroke results in turning the crankshaft through a predetermined angle.

In the event the invention is implemented in an Otto engine, the amount of fuel supplied to the engine per operating stroke is characterized by filling of the engine cylinder with the air-fuel mixture because, aside from the warming-up period of the engine, this relationship—known as lambda—is maintained constant within narrow limits so that each filling of the cylinder with mixture per operating stroke involves the use of a certain fuel percentage. Since the swept capacity of the engine does not change, the filling of the cylinder is determined by the specific mixture volume upstream of the inlet valve and thus by the intake manifold pressure which is immediately and linearly related with the specific volume. In the case of the Diesel engine the amount of fuel supplied per operating stroke is determined directly by the effective stroke of the injection pump.

The invention to be protected herein is defined exclusively in the appended claims. However, for purposes of disclosure and to facilitate an understanding of the invention, several embodiments are illustrated in the drawings forming part hereof.

DESCRIPTION OF PREFERRED EMBODIMENTS

Figure 1:
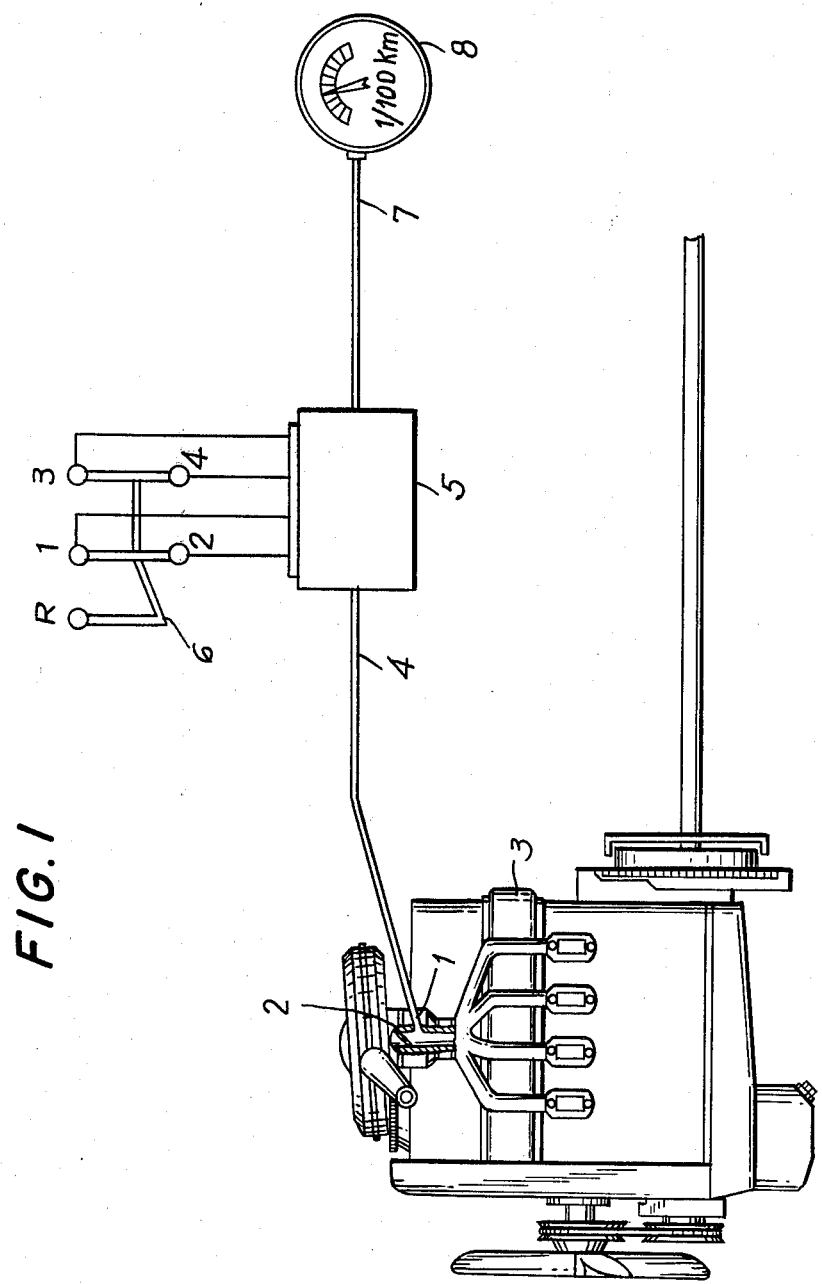
FIG. 1 is a somewhat diagrammatic view, illustrating in principle the incorporation of the invention in an Otto engine.

Referring firstly to the embodiment illustrated in FIGS. 1-4 it will be seen that an Otto engine 3 is illustrated diagrammatically, a more detailed showing not being required because such engines are of course well known per se. The intake manifold of the engine 3 has the usual throttle valve 2 i.e. a butterfly valve, and downstream of this butterfly valve 2 (i.e. downstream as considered in the direction of the inflowing air) the pressure of the intake manifold is tapped at 1 and communicated via a conduit 4 to a pressure transducer 5. A manually shifted transmission 6 is diagrammatically shown in FIG. 1 and will be seen to be connected with the pressure transducer 5 also, so that information concerning the particular gear engaged at any one time is also fit to the pressure transducer 5. The signal arriving in the transducer 5 from the intake manifold of the engine 3 is modulated by the transducer and is forwarded via another conduit 7 to a known-per-se indicating instrument 8 (manometer).

Figure 2:
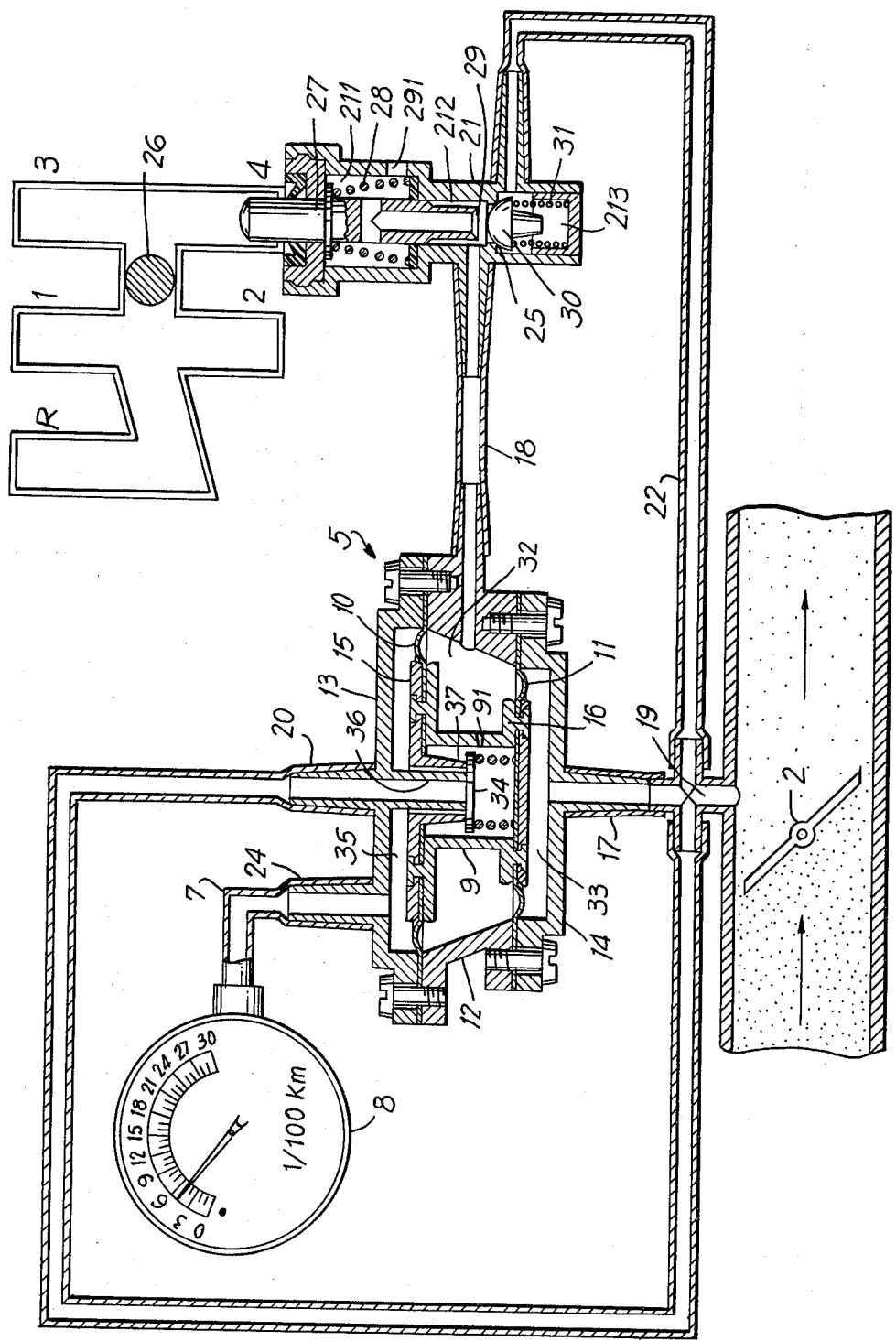
FIGS. 2-4 are somewhat diagrammatic showings, partly in section, of different operating conditions encountered with the vehicle operating in the two upper gears of the transmission.
Figure 3:
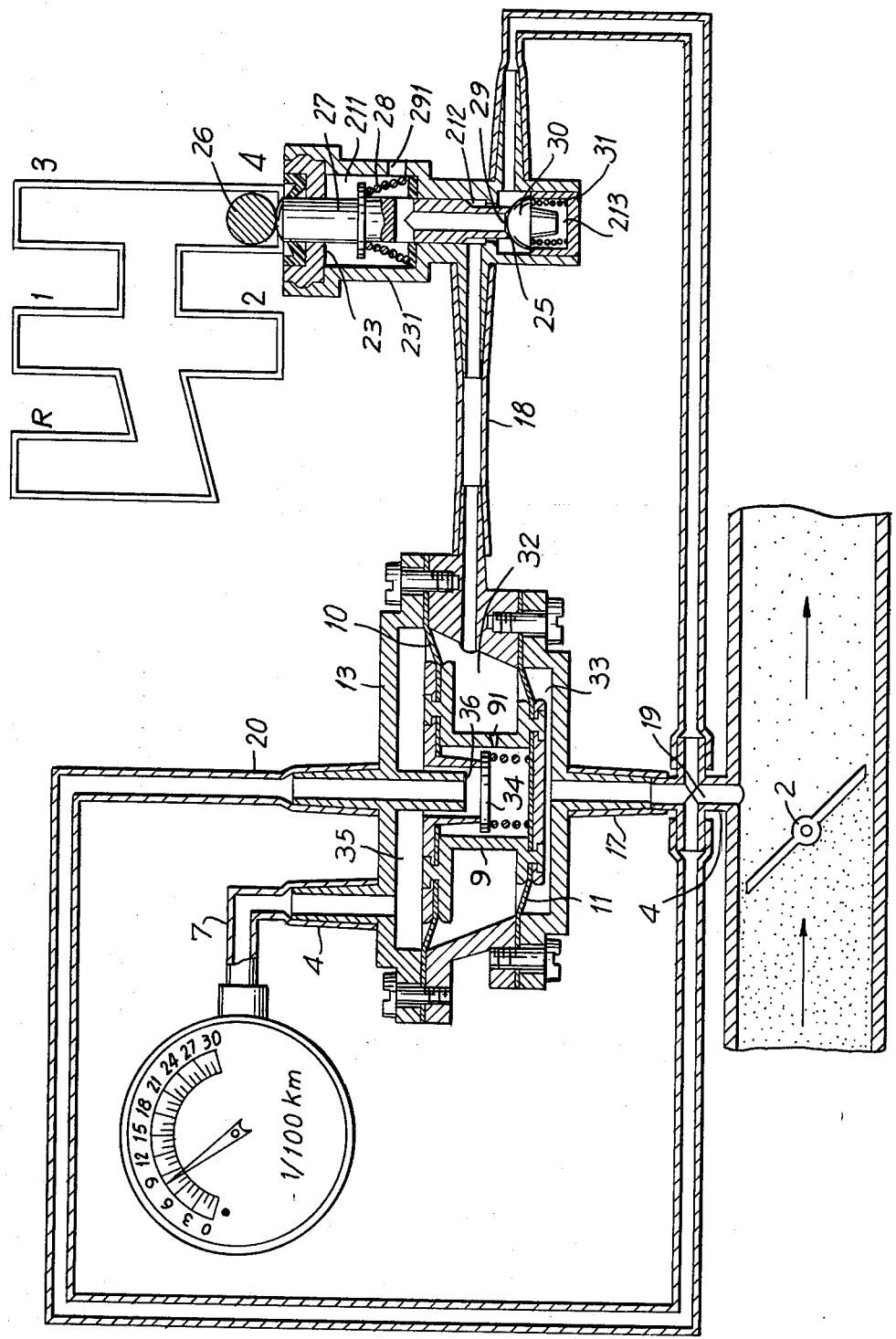
Figure 4:
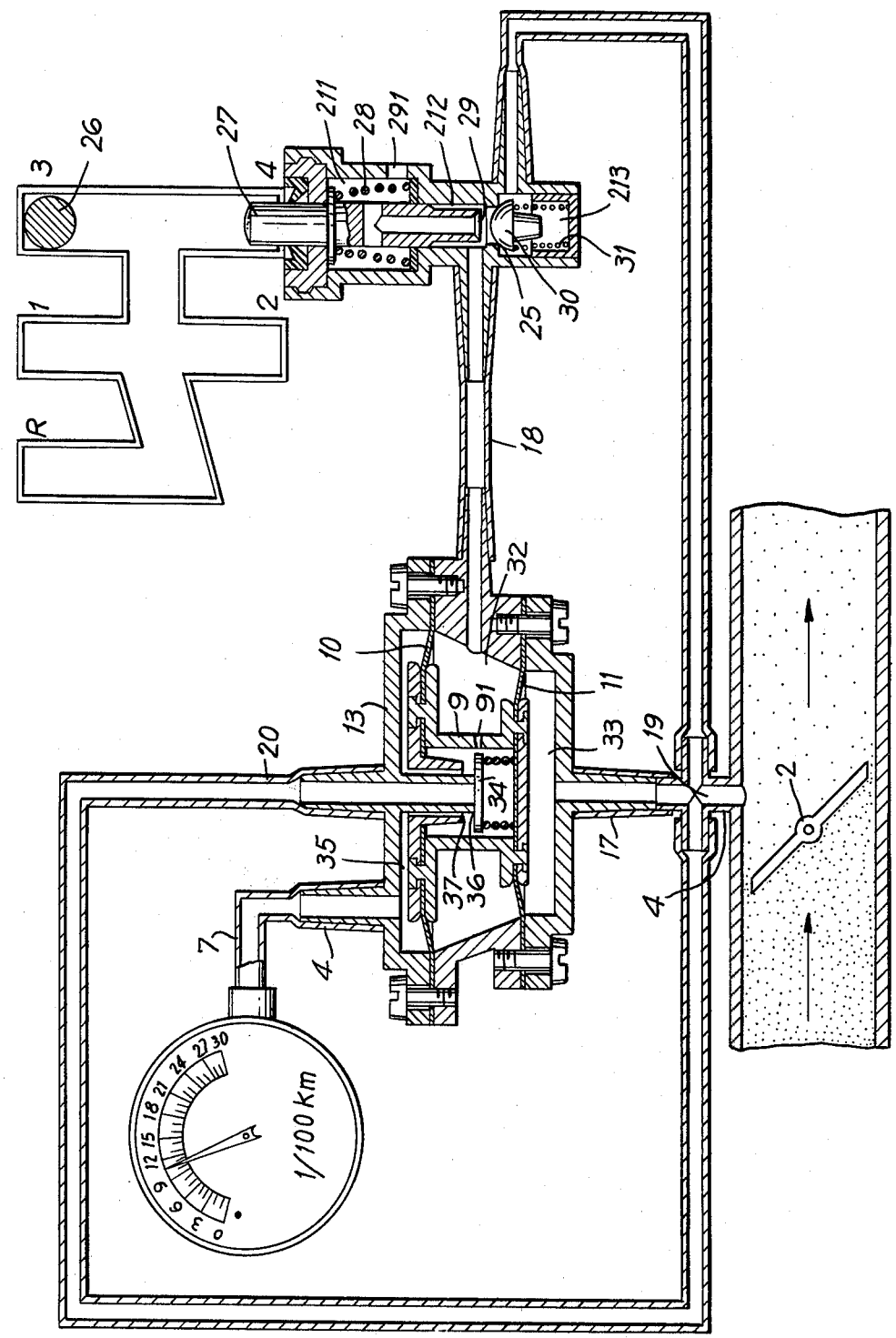

Details of an embodiment of the invention suitable for indicating the amount of fuel used per unit distance travelled with the vehicle in one or another of the two upper gears (e.g. the fourth and the third gear) are shown in FIGS. 2-4. It will be seen that the pressure transducer 5 has a housing 12 the open ends of which are closed by covers 13 and 14. Located in the housing 12 is a rigid coupling member 9 at opposite ends of which are located two plates 15 and 16, respectively. Diaphragms 10 and 11 are secured to opposite ends of the member 9 by means of the plates 15 and 16 and have their outer circumferential edge portions clamped between the housing and the covers 13 and 14, respectively. Ports 17 and 20 of the housing connect the same with take-off port 19 which communicates with the intake manifold downstream of the throttle valve 2 and corresponds to the position identified with reference numeral 1 in FIG. 1.

The diaphragms 10 and 11 at different surface areas, the relationship between these surface areas corresponding to the ratio between the third and fourth gear of the transmission. The housing of the transducer 5 further has a port 18 via which it communicates with a three-port two-position valve 21 which in turn communicates with the location 19 by means of a conduit 22. Finally, a conduit 24 connects the outward port of the transducer 5 with the manometer 8.

Only the shift gate of the transmission is indicated diagrammatically in FIGS. 2-4, with the first, second, third and fourth gear being shown, as well as the reverse gear which is identified with reference character R. In this gate a shift lever 26 is moveable in the usual manner and when the shift lever 26 engages the fourth gear of the transmission, i.e. moves into that part of the gate in which the fourth gear is engaged, it displaces a plunger 27 of the valve 21 counteracting the force of restoring spring 28. This causes an axial vent bore 29 of the plunger 27 to be closed at the inner end of the plunger by engagement with a valve body 30 which, at the same time, is lifted off a valve seat 25 counteracting the biasing force of a spring 31. As a result, a connection is established via the conduits 22, 18 between the location 19 and a chamber 32 defined in the transducer 5 between the diaphragms 10 and 11.

In addition to the chamber 32 the transducer has a chamber 33 which is in constant communication with the location 19 via the conduit 17; this chamber 33 is bounded by the diaphragm 11 and the cover 14 of the housing. The chamber 32, on the other hand, is connected either with the atmosphere via the conduit 18 and the valve 21, or else it is also connected with the location 19 via the conduit 22. A third chamber 35 is defined between the diaphragm 10 and the cover 13 of the housing and communicates constantly via port 24 and conduit 7 with the manometer 8.

The plate 15 has a central, recessed valve seat 37 through which extends, co-axially and with radial clearance, a valve seat 36 which is of one piece which is rigid with the cover 13 and which communicates with the port 20. In the rest position a valve plate 34 engages the valve seats 36 and 37 under the force of a spring located in the member 9 within the confines of the space or chamber 32. Chamber 32 is also in communication with the interior of the member 9 by a bore 91.

When fourth gear has been engaged (see FIG. 3) the pressure in the chambers 32 and 33 at opposite sides of the diaphragm 11 is identical. No pressure from diaphragm 11 acts upon the diaphragm 10, so that an equilibrium will develop at the diaphragm 10 due to the fact that the entire system 9, 10 and 11 and the valve plate 34 will lift off the valve seat 36 until the pressure of the intake manifold has been communicated to the chamber 35 via the bore 91, as is shown in FIG. 3.

The manometer 8 is constantly subjected to the pressure in the chamber 35. When, now, the transmission of the vehicle is shifted from fourth gear down into third gear as shown in FIG. 4, the diaphragm system within the transducer 5 assumes the position illustrated in FIG. 4 immediately after down-shifting from fourth gear into third gear. This is because, as the gear shift lever 26 moves from fourth gear to third gear and disengages the plunger 27, the latter now returns under the urging of the restoring spring 28 which is located in the inlet chamber 211, into engagement with the seat 23 of the valve housing 231, releasing the valve body 30 which is located in the second inlet chamber 213 of the valve housing so that the valve body can be pressed against the seat 25 by the spring 31. This causes an interruption of the communication between the chamber 32 of transducer 5 and the location 19 via the conduits 18, 22. At the same time, however, the plunger 27 disengages from the valve body 30, thus establishing a communication of the chamber 212 with the ambient atmosphere via the bores 29 and 291. This is communicated to the space 32 and results in the attainment of an equilibrium between the effect of the pressure in the intake manifold via conduit 20 acting upon the diaphragm 10 and the modulated pressure acting in space 35 on the diaphragm 11, in that the initially higher force acting on the diaphragm 10 causes the diaphragm system 9, 10, 11 to move in direction towards the cover 13 so that the valve seat 37 temporarily disengages the valve plate 34, until air now flows from chamber 32 into the chamber 35. The pressure differences on the diaphragm 10, 11 are unequal, in that the pressure difference on the diaphragm 10 is smaller than the pressure difference on the diaphragm 11 in the ratio of the surface areas of the diaphragms 10 and 11. When equilibrium has been established, the diaphragm system returns to the rest position shown in FIG. 2.

When the vehicle travels, i.e. when it is not stationary with the engine idling, the pressure prevailing in conduit 7 and the vehicle travelled in third gear or in the lower gears (first and second) is constantly modulated by venting or evacuating the chamber 35 to accommodate it to the intake manifold pressure in the ratio of the surface area of the diaphragms 11 and 10. If the vehicle travels in fourth gear, the pressure prevailing in the intake manifold at any given time is, however, always maintained also in the chamber 35. The manometer 8 is constantly supplied via the conduit 7 with the outward pressure of the transducer 5 which is being modulated in the chamber 35 so that an exact indication of the rate of fuel used per unit distance travelled is provided for third and fourth gear operation. For second and third gear operation, only an indication of the fuel tendency (economical or uneconomical) is provided.

In the case of an Otto engine, the operating parameter is provided by the varying intake manifold pressure. The invention is, however, also to be usable with Diesel engines and in the case of those a pressure of this type must be artificially produced.

Figure 5:
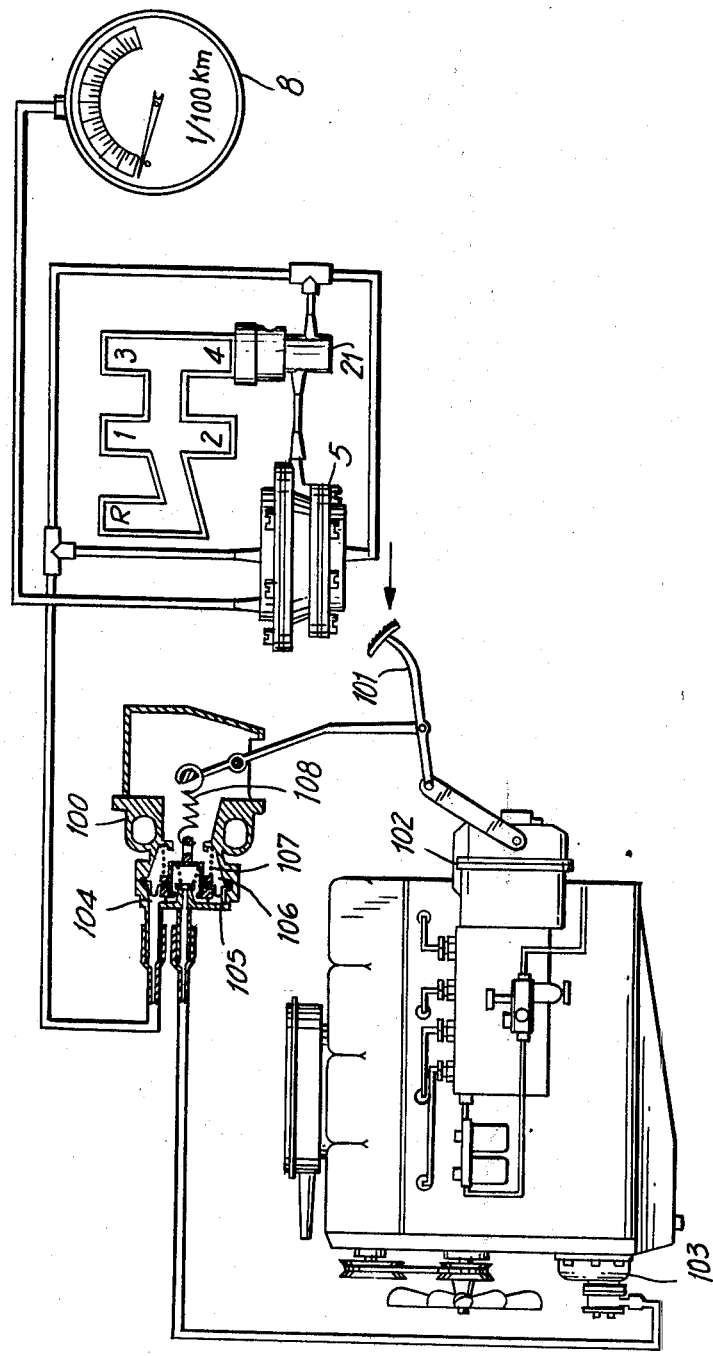
FIG. 5 is a view analogous to FIG. 4 but illustrating the invention embodied in a Diesel engine.

FIG. 5 shows how this can be done. The pressure transducer 5 and the valve 21, as well as the manometer 8 are the same as described before. The pneumatic pressure signal indicative of the quantity of fuel introduced into the cylinder per operating stroke is here, however, a pressure which is modulated by a mechanical transducer 100 and which increases proportionally to the movement of a pedal 101 or in accordance with another distance traversed by some element and indicative of the effective stroke of the fuel injection pump 102. A vacuum pump 103 is provided as a source of suction and connected to the transducer 100. The latter operates on the principle of force equilibrium so that the pressure modulated in the diaphragm chamber 104 exerts upon the surface diaphragm 105 a force which is at equilibrium with a compound force acting in chamber 106 on the diaphragm 105 and resulting from the atmospheric pressure and the forces exerted by a restoring spring 107 and a working spring 108. The spring 108 is tensioned by movement of the pedal 101 which in turn is characteristic in its extended movement of the effective stroke of the injection pump 102. Therefore, the alternation between venting and evacuating the chamber 104 which has already been described earlier with respect to the transducer 5, causes an output pressure to be formed in the chamber 104 which is constantly being adapted to the force exerted by the spring 108. The transducer 100 thus produces for each operating condition of the Diesel engine a certain output pressure in the chamber 104, and this pressure is applied via the conduit 4 to the transducer 5 which then operates in the manner described in connection with the preceding embodiment. In other words, the pressure relationships obtained in this manner correspond to the pressure relationships in the intake manifold of an Otto engine and can be treated in the transducer 5 in the same manner.

Figure 6:
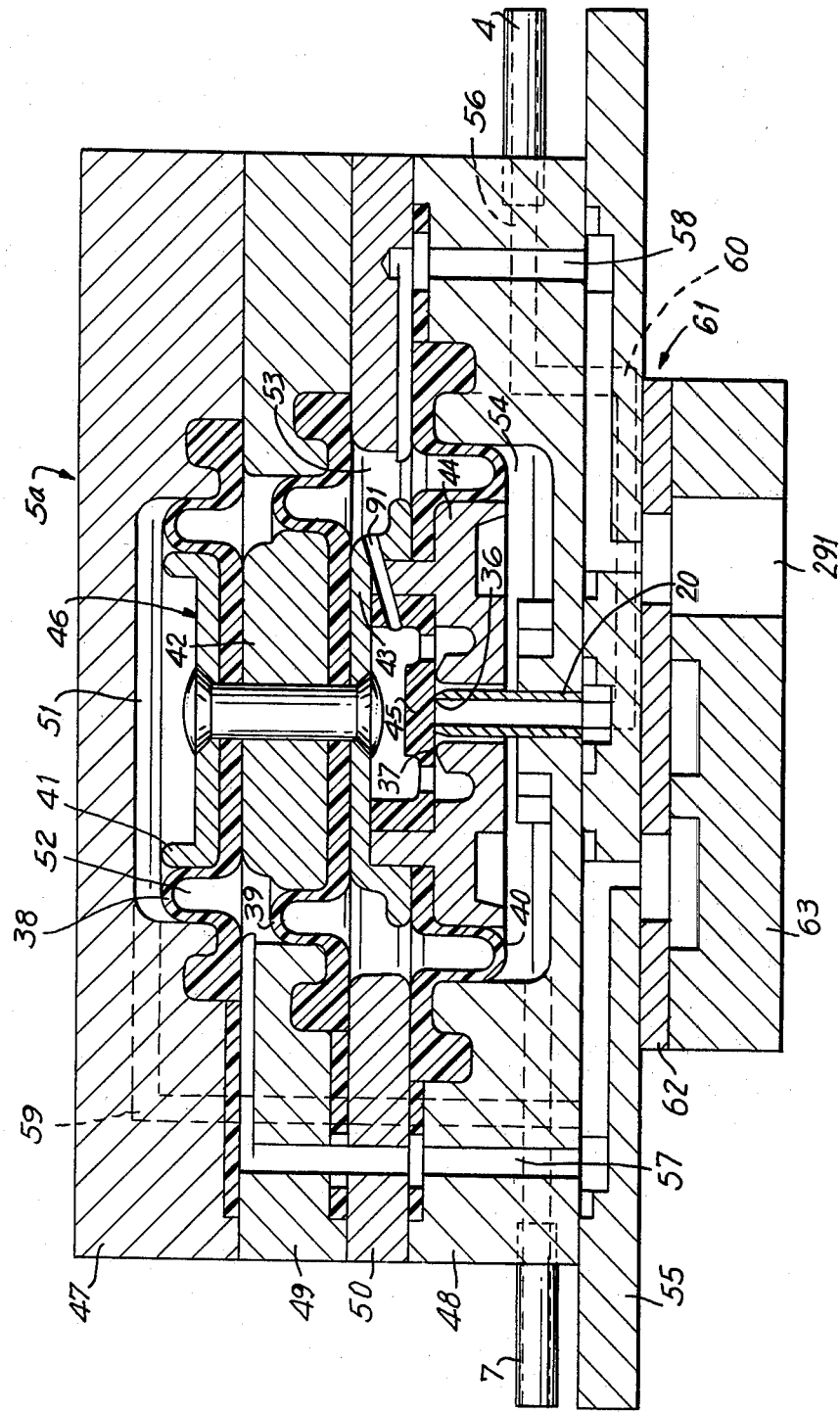
FIG. 6 is a section through a pressure transducer for use in another embodiment of the invention.

FIG. 6 shows a further embodiment of the invention, or rather more specifically a pressure transducer 5a (the other components being the same as in the preceding embodiments) which permits an indication of the fuel consumption per unit of distance travelled relative to all four gears of the vehicle transmission (of course the invention can analogously be used with two speed, three speed, or five speed transmission).

The transducer 5a in FIG. 6 will be seen to have a set of three diaphragms 38, 39 and 40 which are rigidly connected with one another via plates 41, 42, 43 and 44 and with a valve diaphragm 45, to form a diaphragm system 46. The outer circumferential edges of the various diaphragms are clamped by the covers 47, 48 and spacing rings 49 and 50.

Figure 7:
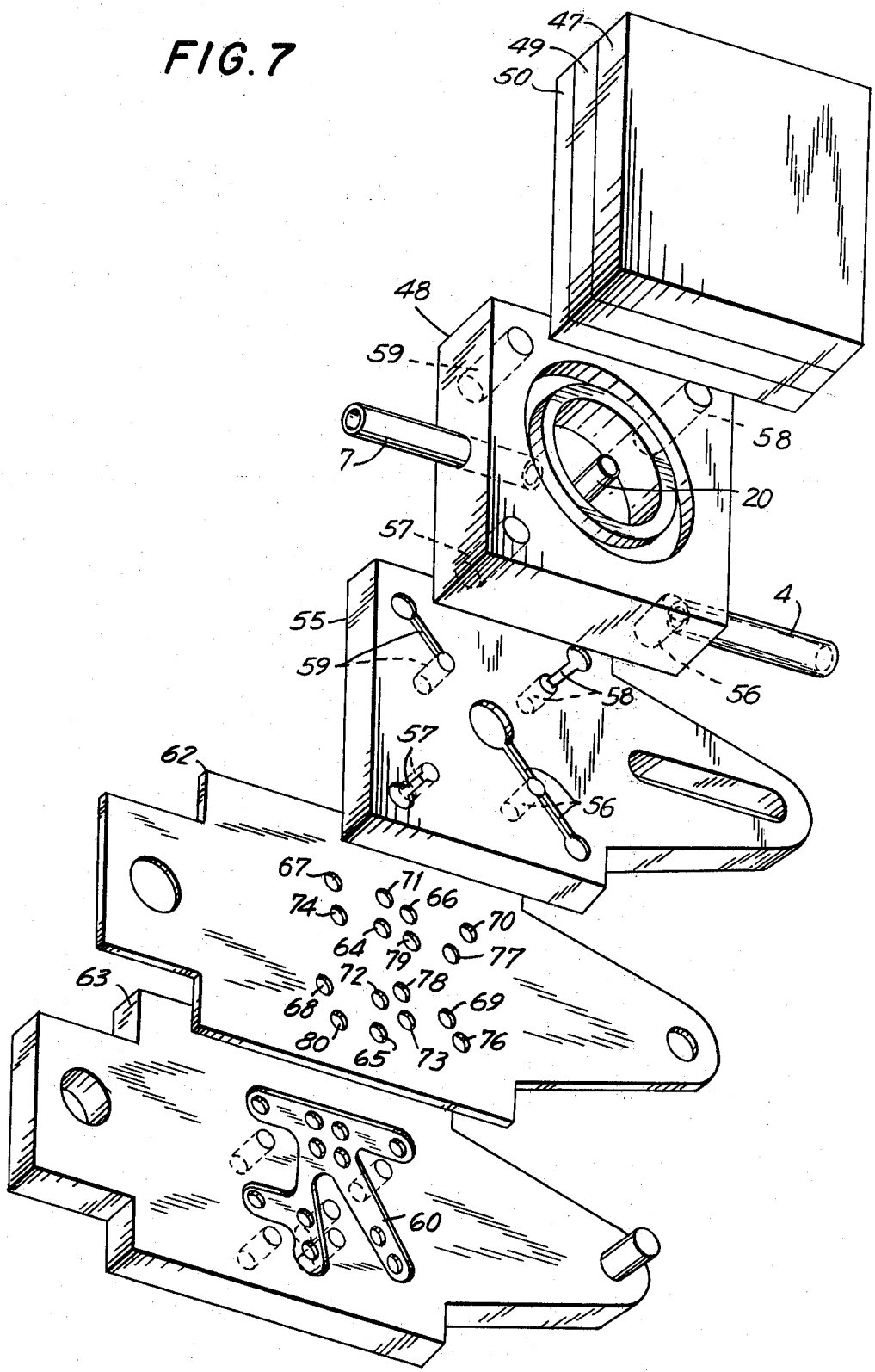
FIG. 7 is an exploded view showing the transducer of FIG. 6.
Figure 12:
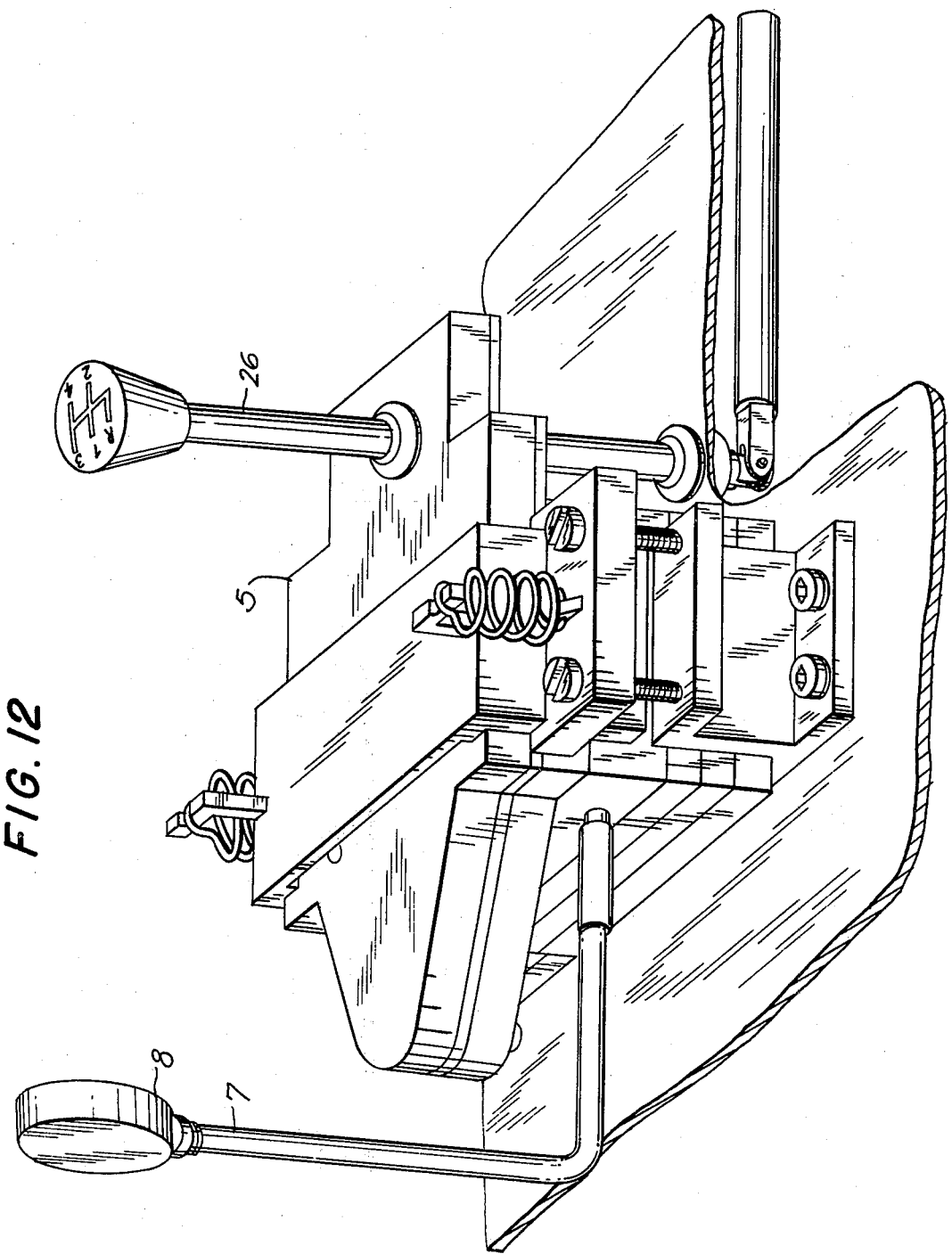
FIG. 12 is a perspective view, illustrating the device according to the invention associated with a gear shift lever of a vehicle.

The cover 47 and the diaphragm 38 together define and bound a chamber 51, and with the diaphragm 39 and the ring 49 the diaphragm 38 forms a further chamber 52. Diaphragms 39 and 40 form with the ring 50 a chamber 53 and the diaphragm 40 and cover 48 together form a diaphragm chamber 54. The chambers are connected via channels 7, 56, 57, 58, 59, and 60 provided in the covers and spacing rings with a distributor plate 55 which is mounted on the cover 48 in sealing engagement therewith. FIG. 7 shows that the conduit 4 which supplies the pressure of the intake manifold communicates via plate 55 with the cover 48, and that it is extended via one of the channels 56 to the distributor plate 55. The chamber 54 is connected via the conduit 7 in the cover 48 with the manometer 8 (compare FIG. 12).

The channels 57, 58 and 59 are bores which terminate in the outer surface of the distributor plate 55, where the channel 56 supplying intake manifold pressure is also terminated. At the inner side of the distributor plate 55 a channel 60 provides a connection to the tube 20 which is arranged concentric to the diaphragms in the cover 48 and which supplies the intake manifold pressure. A spring bias slide 61 engages the distributor plate 55 in a sliding relationship therewith, and can be moved to different positions by an element, e.g. the gear shift lever 26 (FIG. 12) as this element moves to different positions indicative of different engaged gears of the transmission.

FIG. 7 shows the slide 61 in detail and it will be seen that it is composed of a base plate 62 which firmly and sealingly is connected with a carrier plate 63. The latter has channels which connect those bores of the plate 62 in which intake manifold pressure is present. Bores 64-72 are connected via the channels of the plate 63 with the conduit 4 which communicates with the bore 56 of the plate 55. The bores 73, 74, 76-80 are connected to the ambient atmosphere via cutouts 291 in the carrier plate 63 (compare FIG. 6).

In each position of the lever 26, and hence in each one of several different positions of the slide 61, certain bores of the plate 62 of the slide 61 move into registry with predetermined bores of the plate 55. This is in accordance with a preselected scheme, a possible one of which is illustrated in FIGS. 8-11 for the different transmissions gears.

Figure 8:
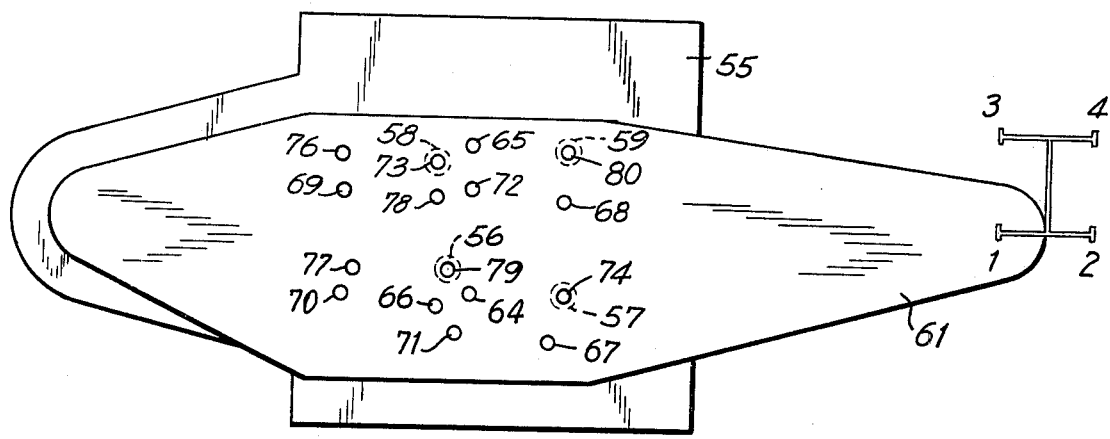
FIGS. 8-11 show different positions of a component of the transducer in FIGS. 6 and 7, which are assumed by this component in four different vehicle operating gears.

FIG. 8 shows that when the first transmission gear is engaged the chamber 51 receives the pressure prevailing in the intake manifold of the engine, where as the chambers 52 and 53 communicate with the ambient atmosphere.

Figure 9:
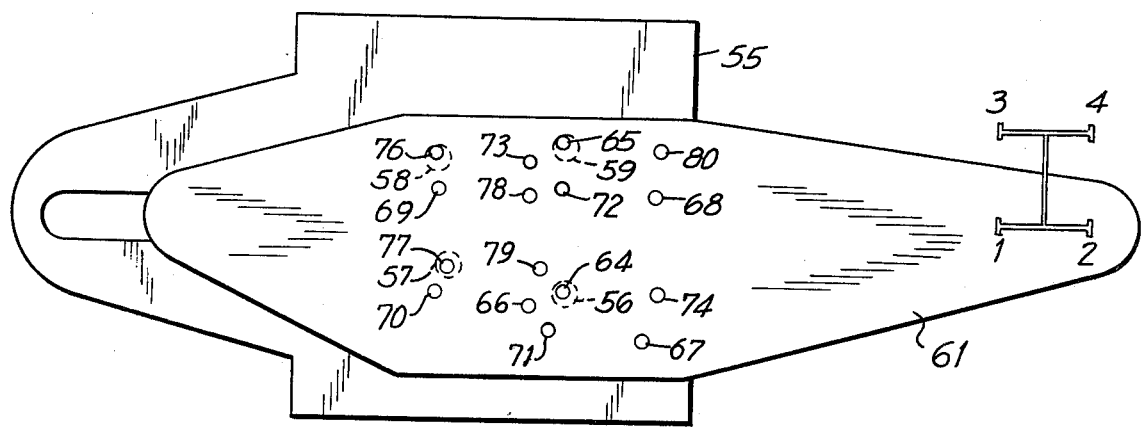

When the second gear is engaged, as shown in FIG. 9, the pressure prevailing in the intake manifold of the engine is communicated to the chamber 52 whereas the chambers 53 and 51 are connected with the ambient atmosphere.

Figure 10:
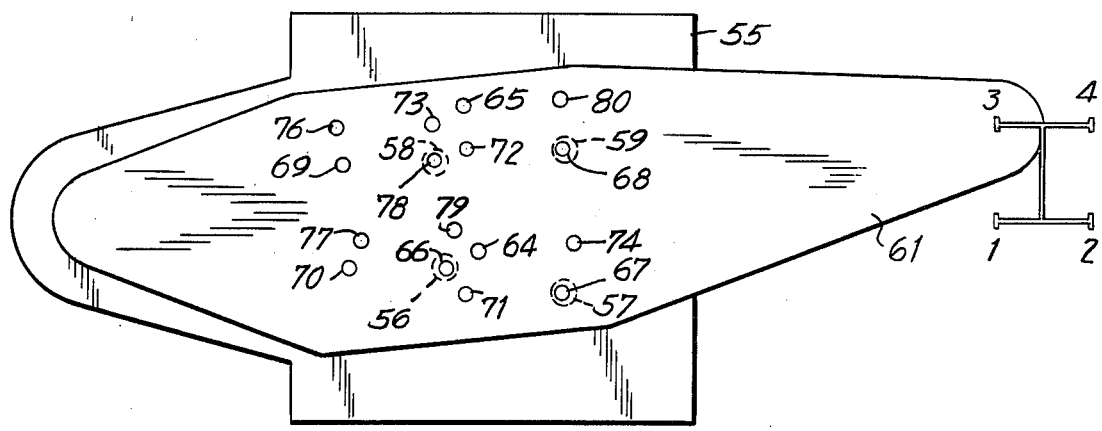

FIG. 10 shows that when the third gear of the transmission is engaged, it is the chamber 53 which is connected to the intake manifold of the engine to be at the same pressure as the intake manifold, whereas the chambers 51 and 52 communicate with the ambient atmosphere.

Figure 11:
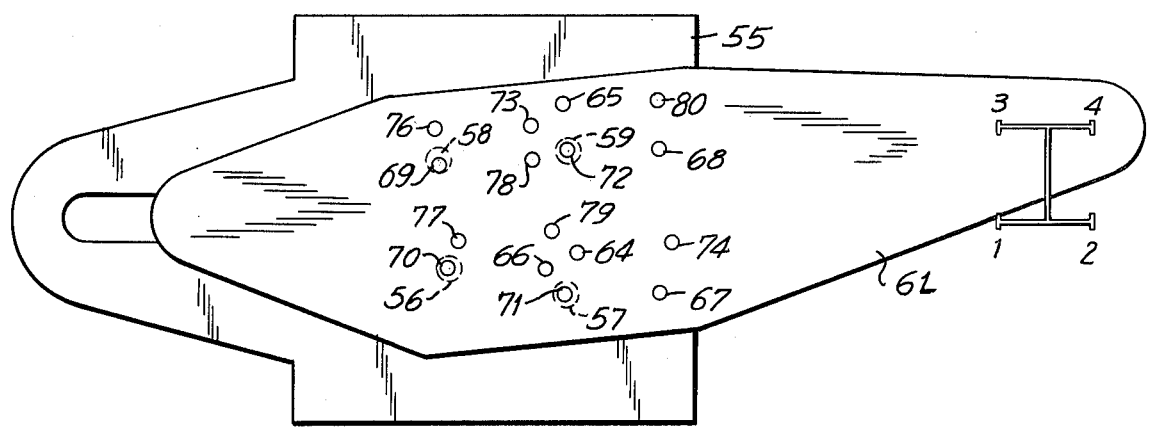

Finally, when the fourth gear of the transmission is engaged, then—as shown in FIG. 11—negative pressure is supplied to the chambers 51, 52 and 53 and no force acts upon the diaphragms 38 and 39 since each of them is subjected at both sides to identical pressure.

The pressure equilibrium at the diaphragm system 46 is provided, via the regulating mechanism described earlier by evacuating or connecting the chamber 54 to the atmosphere, in that the pressure condition in the chamber 54 is constantly adapted to the pressure prevailing at any one time in the engine intake manifold, by alternately opening or closing the valve seats 36, 37 via the valve plate 45.

When the third gear is engaged, the diaphragm 38 is exposed at both of the sides to the intake manifold pressure so that the pressure acting upon it is in equilibrium. The diaphragm 39 is subjected to intake manifold pressure in the chamber 52, and to ambient atmospheric pressure in the chamber 53. Equilibrium of forces between the diaphragms 39 and 40 is produced by so modulating the pressure in the chamber 54 that the pressure difference between the chambers 52 and 53 has to the pressure difference between the chambers 54 and 53 a relationship corresponding to the relationship of the surfaces of the diaphragms 40 and 39 to one another.

When the second gear is engaged the chambers 53 and 52 are communicated with the ambient atmosphere so that pressure acts only upon the differential surface area of the diaphragms 38 and 39, causing the pressure in the chamber 54 to be so modulated that the pressure difference between the chamber 54 and the chamber 53 has to the pressure difference between the chamber 52 on the one hand and the chambers 53 and 51 on the other hand, a relationship corresponding to the surface area difference between the diaphragms 38 and 39 to the surface of the diaphragm 40.

Finally, when the first gear is engaged the chambers 52 and 53 are communicated with the ambient atmosphere so that only the diaphragm 38 is subjected to pressure, causing the pressure in the chamber 54 to be so modulated that the pressure difference between the chamber 54 and the chamber 53 has to the pressure difference between the chamber 51 and the chamber 52 a relationship corresponding to the relationship of the surface area of diaphragm 38 to the surface area of diaphragm 40.

It will be appreciated that the invention is susceptible of a variety of modifications all of which are intended to be encompassed within the protection sought. For example, in the embodiment of FIGS. 6–12 the channel 91 leading to the valve arrangement 36, 37 and 45 need not communicate with the chamber 53 but could instead communicate with the chambers 52 or 51. Under such circumstances different diaphragm surface area ratios and an appropriately modified association of the bores in the plate 55 with the bores in the slide 61 will be required.

The invention has herein been illustrated by way of several exemplary embodiments. It will be appreciated, however, that it is not to be considered limited to these embodiments and that the scope of protection sought is defined exclusively in the appended claims.

What is claimed is:

1. An arrangement for indicating the on-going fuel consumption of an operating internal combustion engine in a motor vehicle having a multi-stage transmission, comprising: means for sensing an engine operating parameter indicative of the quantity of fuel being supplied to the engine per engine revolution; an indicating instrument; means for transmitting to said instrument a signal representative of the sensed parameter; and means for modulating the signal as a function of the currently engaged stage of the transmission; said engine being a Diesel engine having a variable-stroke fuel injection pump; said modulating means comprising a pressure transducer and said transmitting means comprising a passage connecting an output of said transducer to said instrument; and wherein said sensing means comprises vacuum-producing means connected with an input of said transducer and operative for producing a vacuum which varies as a function of the injection pump stroke.

2. An arrangement for indicating the on-going fuel consumption of an operating internal combustion engine in a motor vehicle having a multi-stage transmission, comprising: means for sensing an engine operating parameter indicative of the quantity of fuel being supplied to the engine per engine revolution; an indicating instrument; means for transmitting to said instrument a signal representative of the sensed parameter; and means for modulating the signal as a function of the currently engaged stage of the transmission; said sensing means comprising a valve movable in response to changes in the engaged transmission stage to a plurality of positions each of which corresponds to a different engaged stage; and wherein said modulating means comprises a transducer having a housing, a pair of diaphragms of differential surface areas, a member connecting and movable with said diaphragms and defining with the same a chamber and a port communicating said chamber with said valve, said chamber being subjected to different pressures in dependence upon the position of said valve.

3. An arrangement as defined in claim 2, said housing defining with one of said diaphragms another chamber and with the other of said diaphragms a further chamber both of which are separate from the first-mentioned chamber; said sensing means further including a first passage connecting said another chamber with a suction manifold of said engine in open communication therewith; and said transmitting means including a second passage connecting said further chamber with said indicating instrument.

4. An arrangement as defined in claim 3, wherein said valve is a three-port two-position valve having a valve member engageable by a gearshift lever of said transmission so as to be moved thereby between said positions.

5. An arrangement as defined in claim 4, said valve including means defining one flow path for communicating said chamber with the ambient atmosphere, and another flow path for communicating said chamber with said suction manifold.

6. An arrangement as defined in claim 5, said valve having a housing including one inlet compartment communicating with the ambient atmosphere, and another inlet compartment, a valve member extending through said one compartment and having a bore adapted to connect said one inlet compartment with an outlet compartment of said valve housing; and means for connecting said outlet compartment with said other inlet compartment, including a valve seat, a valve body, a spring urging said valve body onto said valve seat, and means mounting said valve member for movement to and from a position in which it moves said valve body off said valve seat so that the valve body blocks said bore.

7. An arrangement as defined in claim 3 wherein said chamber communicates with a bore in said member, plate means connected to one of said diaphragms and having a central tapered first valve seat, cover means having a second valve seat fixed thereto, said second valve seat being in a suction pipe pressure connection, said second valve seat being coaxially and radially spaced from within said first valve seat, spring actuated valve plate means closing simultaneously said first and second valve seats when in intial position.

8. An arrangement as defined in claim 2, wherein the ratio of the surface areas of said diaphragms relative to one another corresponds to the transmission ratio of the transmission stages relative to each other.

9. An arrangement for indicating the on-going fuel consumption of an operating internal combustion engine in a motor vehicle having a multi-stage transmission, comprising: means for sensing an engine operating parameter indicative of the quantity of fuel being supplied to the engine per engine revolution; an indicating instrument; means for transmitting to said instrument a signal representative of the sensed parameter; and means for modulating the signal as a function of the currently engaged stage of the transmission; a valve plate cooperating with a suction manifold valve seat and with an air valve seat which is coaxial thereto; said modulating means comprising a pressure transducer including three separate diaphragms each having a different surface area and means rigidly connecting said diaphragms to said valve plate, the diaphragm having the smallest surface area defining with a housing portion of the transducer a first chamber and with the next-larger diaphragm a first compartment, said next-larger diaphragm defining with the largest diaphragm a second compartment and said largest diaphragm defining with another housing portion a second chamber communicating with said transmitting means; and means for connecting said first chamber and first and second compartments to atmospheric pressure or to negative pressure in dependence upon the respectively engaged transmission stage, to thereby modulate the pressure in said second chamber which constitutes said signal.

* * * * *